United States Patent Office 3,836,637
Patented Sept. 17, 1974

3,836,637
STABLE HAIR LACQUER GEL COMPOSITIONS
Irving R. Schmolka, Grosse Ile, Mich., assignor to BASF Wyandotte Corporation, Wyandotte, Mich.
No Drawing. Continuation-in-part of application Ser. No. 580,204, Sept. 19, 1966, now Patent No. 3,740,421. This application Jan. 2, 1973, Ser. No. 320,521
The portion of the term of the patent subsequent to Feb. 1, 1989, has been disclaimed
Int. Cl. A61k 7/00, 7/10
U.S. Cl. 424—70    5 Claims

ABSTRACT OF THE DISCLOSURE

Stable hair lacquer gel compositions are prepared from alkylmonoesters of poly(methylvinylether/maleic acid) and as a matrix therefor, aqueous gels of certain polyoxyethylene polyoxypropylene block copolymers.

This application is a continuation-in-part of copending U.S. patent application Ser. No. 580,204, filed Sept. 19, 1966, now U.S. Pat. No. 3,740,421.

BACKGROUND OF THE INVENTION

1. Field of the Invention

The present invention relates to aqueous gel compositions containing poly(methylvinylether/maleic acid) resins. More particularly, the invention relates to compositions prepared from aqueous gels of certain polyoxyethylene polyoxypropylene block copolymers as a matrix for alkylmonoesters of poly(methylvinylether/maleic acid) resins.

2. Prior Art

The preparation of hair lacquer compositions is well known in the art as is the use of alkylmonoesters of poly(methylvinylether/maleic acid) resins in such compositions. Heretofore, however, all such resins have been formulated into aerosol hair sprays. Because of the hazards of using aerosol hair sprays, new methods of applying hair lacquers have been sought. It has now been determined that poly(methylvinylether/maleic acid) resins can be formulated into stable aqueous gel compositions employing certain polyoxyethylene polyoxypropylene block copolymers as the gelling agent. The resulting compositions exhibit exceptional stability and are easily applied and removed.

SUMMARY OF THE INVENTION

Stable gel compositions are prepared from alkylmonoesters of poly(methylvinylether/maleic acid) resins and as a matrix therefor, aqueous gels of certain polyoxyethylene polyoxypropylene block copolymers. For a more comprehensive discussion of the present invention, reference is made to the following detailed description and examples thereof.

As used herein, the term "gel" is defined as a solid or semisolid colloid containing considerable quantities of water. The particles in a gel are linked in a coherent meshwork which immobilizes the water. A colloidal solution with water as the dispersion medium is often called a "hydrosol." The gels within the scope of the present invention are more specifically "ringing" gels and may be described as gels that have a firm jelly-like consistency; that is, by tapping the gel lightly it will vibrate and return to its original configuration.

DESCRIPTION OF THE PREFERRED EMBODIMENTS

The compositions of the present invention comprise (1) from about 1 part to 10 parts by weight of an alkylmonoester of poly(methylvinylether/maleic acid) and (2) as a matrix therefor, from 99 parts to 90 parts by weight of an aqueous gel comprising, based on 100 parts by weight, (a) from 15 parts to 40 parts, preferably from 18 parts to 25 parts, of a polyoxyethylene polyoxypropylene block copolymer and (b) from 60 parts to 85 parts, preferably from about 75 parts to 82 parts, of water.

The resins of use in the preparation of the gel compositions of the present invention are alkylmonoesters of poly(methylvinylether/maleic acid). The resins may be represented by formula I below:

(I) 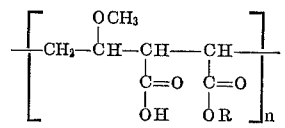

where R is an alkyl group of from 1 to 4 carbon atoms and $n$ is an integer such that the molecular weight of the resin ranges from 100,000 to 500,000. The resins are commercial products commonly known as Gantrez resins.

The polyoxethylene polyoxypropylene block copolymers which may be employed in the preparation of the gels of the present invention may be replaced by the formula:

(II)   $HO(C_2H_4)_b(C_3H_6O)_a(C_2H_4O)_bH$ wherein $a$ is an integer such that the hydrophobe represented by $(C_3H_6O)$ has an average molecular weight from about 2250 to 4000, and $b$ is an integer such that the hydrophile portion represented by $(C_2H_4O)$ constitutes from 30 to 90, preferably from 50 to 90, weight percent of the copolymer.

The hydrophobe of the polyoxyethylene polyoxypropylene block copolymers of formula (II) above is prepared by adding propylene oxide to the two hydroxyl groups of a propylene glycol nucleus. By adding ethylene oxide to the hydrophobe, it is possible to place polyoxyethylene hydrophilic groups on both ends of the molecule. These hydrophilic polyoxyethylene groups may be controlled to constitute anywhere from 10% to 90% of the final molecule. A more detailed explanation of the preparation of these block copolymers may be found in U.S. Pat. No. 2,674,619.

Illustrative block copolymers of formula (II) above which may be employed in the preparation of the gels of the present invention are presented in Table I.

TABLE I

| Copolymer: | Mol. wt. of hydrophobe (average) | Wt. percent of hydrophile (average) | Approx. total mol. wt. of copolymer |
| --- | --- | --- | --- |
| A | 2,250 | 50 | 4,600 |
| B | 2,250 | 70 | 7,500 |
| C | 2,250 | 80 | 10,750 |
| D | 2,750 | 45 | 4,910 |
| E | 2,750 | 60 | 6,450 |
| F | 2,750 | 80 | 13,500 |
| G | 3,250 | 35 | 4,910 |
| H | 3,250 | 45 | 6,050 |
| J | 3,250 | 50 | 6,550 |
| K | 3,250 | 80 | 15,500 |
| L | 4,000 | 15 | 4,710 |
| M | 4,000 | 25 | 5,340 |
| N | 4,000 | 35 | 6,150 |
| O | 4,000 | 70 | 13,500 |
| Q | 4,000 | 80 | 20,000 |

Not all of the block copolymers of the formula (II)   $HO(C_2H_4O)_b(C_3H_6O)_a(C_2H_4O)_bH$ may be employed in the present invention. Because of the nature of aqueous solutions of these block copolymers, three variables affect the formation of the gels. Therefore, it is necessary to recognize certain minima for the three variables. These variables are:

(1) the weight percent concentration of block copolymers in the gel,
(2) the molecular weight of the hydrophobe $(C_3H_6O)_a$, and
(3) the weight percent of the hydrophile portion $(C_2H_4O)_b$ of the copolymer.

These minima define a minimum weight percent concentration of the block copolymer with a specific hydrophobe having a minimum weight percent of ethylene oxide that is necessary to form a gel. Thus, at the minimum concentration with a specific molecular weight hydrophobe, a minimum weight percent of ethylene oxide is required before a specific block copolymer will form a gel in an aqueous solution. The minimum weight percent concentrations with specific molecular weight hydrophobes are set out in Table II.

TABLE II

| Mol. wt. of hydrophobe base | Minimum weight percent | | |
|---|---|---|---|
| | Concentration to form a gel | Ethylene oxide required | Total mol. wt. of block copolymer |
| 2,250 | 40 | 50 | 4,600 |
| 2,750 | 40 | 45 | 4,910 |
| 2,750 | 30 | 60 | 6,450 |
| 3,250 | 30 | 35 | 4,910 |
| 4,000 | 30 | 35 | 6,150 |
| 4,000 | 20 | 70 | 13,500 |

In interpreting Table II, it is apparent that at least a 40% weight concentration of the block copolymer having a hydrophobe of at least 2,250 molecular weight with at least about 50 weight percent of ethylene oxide condensed therewith will be necessary to form a gel in an aqueous solution. In all cases, the block copolymers above the minima indicated in Table I will form gels in aqueous solution up to 90 weight percent concentration and higher. Above 90 weight percent concentration, however, the gels tend to become indistinguishable from the starting block copolymer itself. It is to be understood that the molecular weight of the hydrophobe may be other than those illustrated in Table I. Thus, for example, if a hydrophobe of about 2,500 molecular weight is used, it is recognized that a gel may be formed from the block copolymer at a concentration of 40 weight percent in an aqueous solution where about 45 weight percent of ethylene oxide is present in the block copolymer.

The technical explanation for the formation of the gels of the invention is not entirely understood, and the explanation hereinafter is not to be considered as being liimtative of the invention. However, the behavior of these block copolymers in forming the gels is believed to be explained on the basis of hydrate formation. It may be speculated that the hydrophobe, because it is different from the hydrophobe of other types of nonionics, may, in its own right, immobilize the water independently of the oxyethylene chain by hydrogen bonding. It is noteworthy that gel formation occurs at about 70° F. to 80° F., even where the block copolymer contains more than 200 moles of ethylene oxide or over 100 moles per block. It is also believed that the nature of the block copolymer adds to this phenomenon. It should be noted that the block copolymer used in the gels of this invention exhibits a hydrophobe lying between two equal hydrophiles, whereas nonionics commonly encountered, such as the oxyethylated fatty alcohols and alkyl phenols, have only one hydrophile chain. This difference in structure suggests that a loose micelluar structure is obtained with this class of nonionics and that gel formation would more readily involve entrapment of free water in addition to water due to hydrogen bonding.

The compositions of the invention may be prepared in a number of ways. The block copolymer may be dissolved in water cooled to a temperature between 35° F. and 50° F., and the resin slowly added to the cool copolymer solution. The solution is then allowed to warm to room temperature whereby a clear ringing gel is formed. Alternatively, the resin may be added to cold water and then the block copolymer may be added with good mixing. Mixing is continued, maintaining the solution temperature below 50° F. until the copolymer is completely in solution. At this point, the solution is allowed to warm to room temperature, whereby a clear ringing gel is formed. The resin may be added directly to the water or it may be added in the form of an alcohol solution.

The resin may or may not be neutralized in whole or in part by the addition of small amounts of inorganic or organic bases to a pH of 6 to 7, as illustrated in Example III.

In addition to the resins mentioned above, the compositions of the present invention may contain other nontoxic medicaments commonly employed in the treatment of hair. Illustrative of these medicaments are antibiotics such as bacitracin, neomycin sulfate; hormones such as cortisone and hydrocortisone; vitamins, lanolin, glycerine, and various other oils.

The following examples illustrate the invention. All parts are by weight unless otherwise indicated. In the examples the following resins and copolymers are employed.

Resin I—a resin of formula I wherein R is ethyl, said resin having an acid number of 275–300, a specific gravity of 0.983 and a density of 8.18 lbs./gal.

Resin II—a resin of formula I wherein R is isopropyl, said resin having an acid number of 255–285, a specific gravity of 0.957 and a density of 7.98 lbs./gal.

Resin III—a resin of formula I wherein R is butyl, said resin having an acid number of 245–275, a specific gravity of 0.977 and a density of 8.13 lbs./gal.

Resin IV—a resin of formula I wherein R is butyl, said resin having an acid number of 245–275, a specific gravity of 0.962 and a density of 8.02 lbs./gal.

Copolymer P—a 13,500 average molecular weight block copolymer of formula II having a hydrophobe average molecular weight of 4,000 and a hydrophile constituting 70% by weight of ethylene oxide based on the total weight of the copolymer.

Copolymer K—a 15,500 average molecular weight block copolymer of formula I having a hydrophobe average molecular weight of 3,250 and a hydrophile constituting about 80% by weight of ethylene oxide based on the total weight of the copolymer.

Copolymer F—a 13,550 average molecular weight block copolymer of formula I having a hydrophobe average molecular weight of 2,750 and a hydrophile constituting 80% by weight of ethylene oxide based on the total weight of the copolymer.

Copolymer J—a 6,550 average molecular weight block copolymer of formula I having a hydrophobe average molecular weight of 3,250 and a hydrophile constituting about 50% by weight of ethylene oxide based on the total weight of the copolymer.

EXAMPLE I

A stable hair lacquer gel was prepared by adding 22 parts of Copolymer P to 73 parts of water at 35° F. and mixing until all of the copolymer had dissolved in the water. A solution of 2.5 parts of Resin I in 2.5 parts of ethanol was then added to the cooled copolymer solution. The resulting solution was then allowed to warm to room temperature whereby a ringing gel formed. The resulting transparent gel composition once applied to hair dried to a tack-free film and exhibited good gloss, luster and sheen without making the hair stiff or harsh. Moreover, the gel composition exhibited exceptional stability.

EXAMPLE II

A stable hair lacquer gel was prepared by heating to a temperature of 80° C. a mixture of 30 parts of Copolymer K with 2.5 parts of Resin III dissolved in 2.5 parts of ethanol with gentle stirring until a homogeneous mixture is obtained. To the homogeneous mixture was added 65 parts of water. The resulting solution was cooled to room temperature whereby a ringing gel is formed. The composition exhibited the same advantageous properties as described in Example I. Moreover, because of the fact that the gel liquifies when cool, it is easily removed from hair by a simple cool water wash.

EXAMPLE III

Gel composition were prepared from the following ingredients in the manner described in Example I:

(A)

| | Parts |
|---|---|
| Resin II | 6 |
| Copolymer P | 25 |
| Isopropyl alcohol | 5 |
| Water | 64 |

(B)

| | Parts |
|---|---|
| Resin IV | 5 |
| Isopropanol | 5 |
| Copolymer P | 20 |
| 2-amino-2-methylpropanol | 0.2 |
| Water | 69.8 |

(C)

| | Parts |
|---|---|
| Resin III | 6 |
| Isopropanol | 4 |
| Copolymer F | 30 |
| Triisopropanolamine | 0.2 |
| Water | 59.8 |

(D)

| | Parts |
|---|---|
| Resin I | 4 |
| Ethanol | 4 |
| Copolymer J | 40 |
| Water | 52 |

All four compositions possess the advantageous properties discussed in Example I. Moreover, they were highly stable gels.

The embodiments of the invention in which an exclusive property or privilege is claimed are defined as follows:

1. A stable hair lacquer gel composition for treating hair comprising, based on 100 parts by weight,
(A) from 1 part to 10 parts of an alkylmonoester of poly(methylvinylether/maleic acid) having the structural formula:

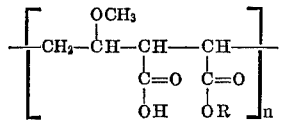

where R is an alkyl group of from 1 to 4 carbon atoms and $n$ is an integer such that the molecular weight of the ester ranges from 100,000 to 500,000,
(B) from 15 parts to 40 parts of a polyoxyethylene polyoxypropylene block copolymer of the formula:

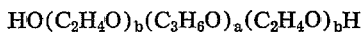

wherein $a$ is an integer such that the hydrophobe represented by $C_3H_6O$ has an average molecular weight of from about 2,250 to 4,000 and $b$ is an integer such that the hydrophile portion represented by $C_2H_4O$ constitutes from 30 to 90 weight percent of the copolymer, and
(C) from 85 parts to 60 parts of water.

2. The composition of claim 1 wherein the block copolymer has a hydrophobe average molecular weight of 4,000 and a hydrophile portion constituting 80 weight percent of the copolymer.

3. The composition of claim 1 wherein the block copolymer has a hydrophobe average molecular weight of 3,250 and a hydrophile portion constituting 70 weight percent of the copolymer.

4. A process for the prepartion of the composition of claim 1 which comprises the steps of:
(a) dissolving from about 15 parts to 40 parts by weight of a copolymer of the formula:

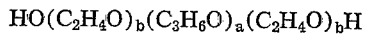

wherein $a$ is an integer such that the hydrophole represented by $C_3H_6O$ has an average molecular weight of from about 2,250 to 4,000 and $b$ is an integer such that the hydrophile portion represented by $C_2H_4O$ constitutes from 30 to 90 weight percent of the copolymer, in 85 to 60 parts of water at a temperature between 35° F. and 50° F.,
(b) adding from 1 part to 10 parts by weight of an alkylmonoester of poly(methylvinylether/maleic acid) having the structural formula:

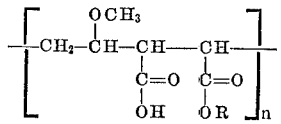

where R is an alkyl group of from 1 to 4 carbon atoms and $n$ is an integer such that the molecular weight of the ester ranges from 100,000 to 500,000, to the cool copolymer solution resulting from step (a), and
(c) allowing the solution resulting from step (b) to warm to room temperature whereby a gel is obtained.

5. A process for the prepartion of the composition of claim 1 which comprises the steps of:
(a) heating to a temperature of between 70° F. to 80° F. a mixture of from 1 part to 10 parts of an alkylmonoester of poly(methylvinylether/maleic acid) having the structural formula:

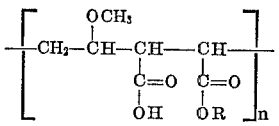

where R is an alkyl group of from 1 to 4 carbon atoms and $n$ is an integer such that the molecular weight of the ester ranges from 100,000 to 500,000, with 15 parts to 40 parts by weight of a block copolymer of the formula:

wherein $a$ is an integer such that the hydrophobe represented by $C_3H_6O$ has an average molecular weight of from about 2,250 to 4,000 and $b$ is an integer such that the hydrophile portion represented by $C_2H_4O$ constitutes from 30 to 90 weight percent of the copolymer to obtain a homogeneous mixture,
(b) adding from 85 parts to 60 parts of water to the heated mixture of step (a) with gentle stirring to obtain a homogeneous solution, and
(c) allowing the solution from step (b) to cool to room temperature whereby a gel composition is obtained.

(References on following page)

References Cited

UNITED STATES PATENTS

| | | | |
|---|---|---|---|
| 3,630,654 | 12/1971 | Rosenthal | 424—71 X |
| 3,639,574 | 2/1972 | Schmolka | 424—78 |
| 3,639,575 | 2/1972 | Schmolka | 424—78 |
| 2,674,619 | 4/1954 | Lundsted | 260—485 |
| 3,740,421 | 6/1973 | Schmolka | 424—65 |
| 3,042,631 | 7/1962 | Strandskou | 260—615 X |
| 3,036,118 | 5/1962 | Jackson et al. | 260—615 X |

OTHER REFERENCES

Drug & Cosmetic Industry, vol. 96, No. 3 (1965), pp. 327, 328, 416, 417, 422–3.

ALBERT T. MEYERS, Primary Examiner

L. SCHENKMAN, Assistant Examiner

U.S. Cl. X.R.

424—78